(12) United States Patent
Tendall

(10) Patent No.: US 12,133,621 B2
(45) Date of Patent: Nov. 5, 2024

(54) HAND FREE FOOTWEAR AND FOOT CLEANING DEVICE

(71) Applicant: John Marshall Tendall, Longboat Key, FL (US)

(72) Inventor: John Marshall Tendall, Longboat Key, FL (US)

(*) Notice: Subject to any disclaimer, the term of this patent is extended or adjusted under 35 U.S.C. 154(b) by 79 days.

(21) Appl. No.: 17/564,722

(22) Filed: Dec. 29, 2021

(65) Prior Publication Data

US 2022/0280017 A1 Sep. 8, 2022

Related U.S. Application Data

(60) Provisional application No. 63/158,003, filed on Mar. 8, 2021.

(51) Int. Cl.
| | | |
|---|---|---|
| *A47L 23/02* | (2006.01) | |
| *A47K 7/04* | (2006.01) | |
| *B05B 1/20* | (2006.01) | |
| *G01V 8/10* | (2006.01) | |

(52) U.S. Cl.
CPC .............. *A47L 23/02* (2013.01); *A47K 7/046* (2013.01); *B05B 1/205* (2013.01); *G01V 8/10* (2013.01)

(58) Field of Classification Search
CPC ........... A47L 23/02; A47L 23/18; A47K 7/00; A47K 7/026; A47K 7/046; B05B 1/205
See application file for complete search history.

(56) References Cited

U.S. PATENT DOCUMENTS

| | | | | |
|---|---|---|---|---|
| 5,964,959 | A * | 10/1999 | Bleth | A47L 23/02 134/182 |
| 9,609,984 | B1 * | 4/2017 | Kelly | A47K 7/04 |
| 11,752,526 | B1 * | 9/2023 | Strickland | B08B 3/02 15/36 |
| 2012/0066847 | A1 * | 3/2012 | Bai | A47L 23/02 15/4 |
| 2016/0174807 | A1 * | 6/2016 | Cruz | A47L 23/02 15/36 |
| 2019/0231166 | A1 * | 8/2019 | Anderson | A47L 23/26 |
| 2021/0345854 | A1 * | 11/2021 | Wells | A46B 13/04 |
| 2022/0248937 | A1 * | 8/2022 | Gonzalez | A47L 23/02 |

FOREIGN PATENT DOCUMENTS

| | | | |
|---|---|---|---|
| DE | 44 08 079 C1 | * | 6/1995 |
| DE | 198 00 898 C1 | * | 7/1999 |
| WO | WO 01/74227 A2 | * | 10/2001 |
| WO | WO 2012/173495 A1 | * | 12/2012 |
| WO | WO 2019/209917 A1 | * | 10/2019 |

* cited by examiner

*Primary Examiner* — Randall E Chin
(74) *Attorney, Agent, or Firm* — Vitale, Vickrey, Niro, Solon & Gasey LLP

(57) ABSTRACT

A hands-free footwear and foot cleaning device which allows the user to clean the bottom or the sole of the footwear as well as the exterior surrounding sides of the footwear. The device can also be used to clean a user's bare foot. The device utilizes a plurality of rollers and a series of water line sprayers that are adapted to spray in a direction to contact one or more of the side portion, bottom portion, or top portion of the sole of a footwear or foot. The sprayers are activated by either a sensor or a pressure devise. The device may also include the option of incorporating additional elements for the purpose of cleaning bare feet rather than just the bottoms of the footwear.

15 Claims, 5 Drawing Sheets

HAND FREE FOOTWEAR AND FOOT CLEANING DEVICE

PRIORITY

This application claims priority to provisional patent application 63/158,003 filed on Mar. 8, 2021.

FIELD OF THE INVENTION

The present invention relates to a hand free footwear and foot cleaning device which allows the user to clean the bottom or the sole of the footwear as well as the exterior surrounding sides of the footwear. The device can also be used to clean a user's foot. The present invention further provides for a decreased need for movement of the foot during the cleaning process. The present invention also includes the option of incorporating additional elements for the purpose of cleaning bare feet rather than just the bottoms of the footwear.

BACKGROUND OF THE INVENTION

One of the most significant issues within the footwear industry is combating the inevitable accumulation of different contaminants and debris on the exterior sides of the footwear, as well as in the exterior sole. This is especially true when the footwear is used on clay or synthetic surfaces on tennis courts. Various debris such as dirt, mud, salt, particulates, and other undesired material are collected on the exterior surface of the footwear with regular use. Such unwanted elements, over time, diminish the appearance, material, and overall structure of the footwear. The unwanted material can also be tracked into a car or house. Because of this, footwear cleaning devices have become vital in combatting the continual buildup of unwanted contaminants on exterior footwear surfaces.

To prevent such issues, innovators have created footwear-cleaning devices which allow for the user to place their foot in the device while wearing footwear and move their foot back and forth within the device's housing to clean the exterior sole and sides of the footwear.

The present invention will improve upon the above-mentioned needed areas of progress for hand free footwear cleaning device. Factors such as the amount of foot movement needed to clean the footwear, the amount of surface-area that a device can cover, and the amount of time required to complete the footwear cleaning process are addressed by the present invention. The present invention will demand significantly less movement of the foot than the current devices require. The present invention will also clean a greater surface area of the footwear than the current devices are capable of. Lastly, the present invention will decrease the amount of time required to thoroughly clean the footwear. In addition, the invention may provide a hand free activation feature, allowing the device to begin operating upon the placement of the footwear inside of the housing of the device.

SUMMARY OF THE INVENTION

The present invention relates to a hand free footwear cleaner by using a plurality of rows of sprayers as opposed to just a single row of sprayers, and a plurality of rows of rollers as opposed to just a single row of rollers, enabling a decreased amount of movement of the footwear required for the sprayers and rollers of the device to reach and interact with the exterior sole and side surfaces of the footwear. The present invention utilizes a pressure activation to initiate the spray, or it may use a sensor to activate the spray. The presence of a sensor to activate the flow of water allows for hand free operation that eliminates the transfer of bacteria and other germs that is caused by numerous users touching a control to turn on and off the flow of water of a device. The present invention also incorporates the ability to clean bare feet, by targeting sprayers towards the top of the foot in addition to the sides and sole.

DETAILED DESCRIPTION OF THE PREFERRED EMBODIMENTS OF THE INVENTION

The following descriptions of the preferred embodiments of the present invention for a hand free device for cleaning a user's footwear or foot are intended to be exemplary of the preferred manner to practice the invention and are not intended to limit the scope of invention in any manner.

The hand free footwear and foot cleaning device allows for a user to clean the bottom and/or sides of any footwear worn by user, or the user's foot (if no footwear is being worn) without requiring the user to contact the device or any mechanism to activate the device without requiring the user to activate the device using their hands. The device activation device could comprise a pressure activation or sensor, such as a photosensor.

Figure 1:
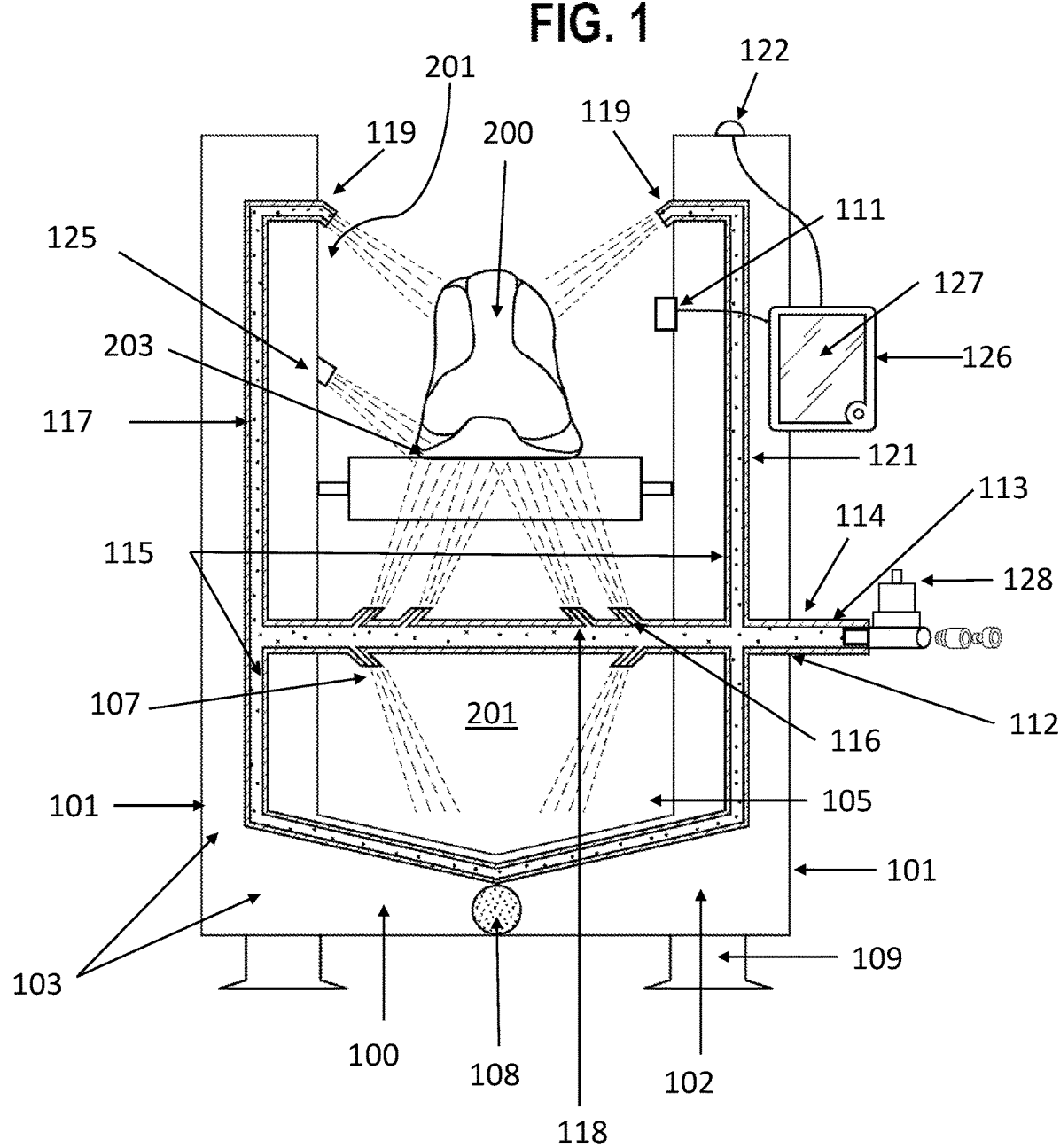
FIG. 1 is a side view of an embodiment of the hand free footwear and foot cleaning device.
Figure 2:
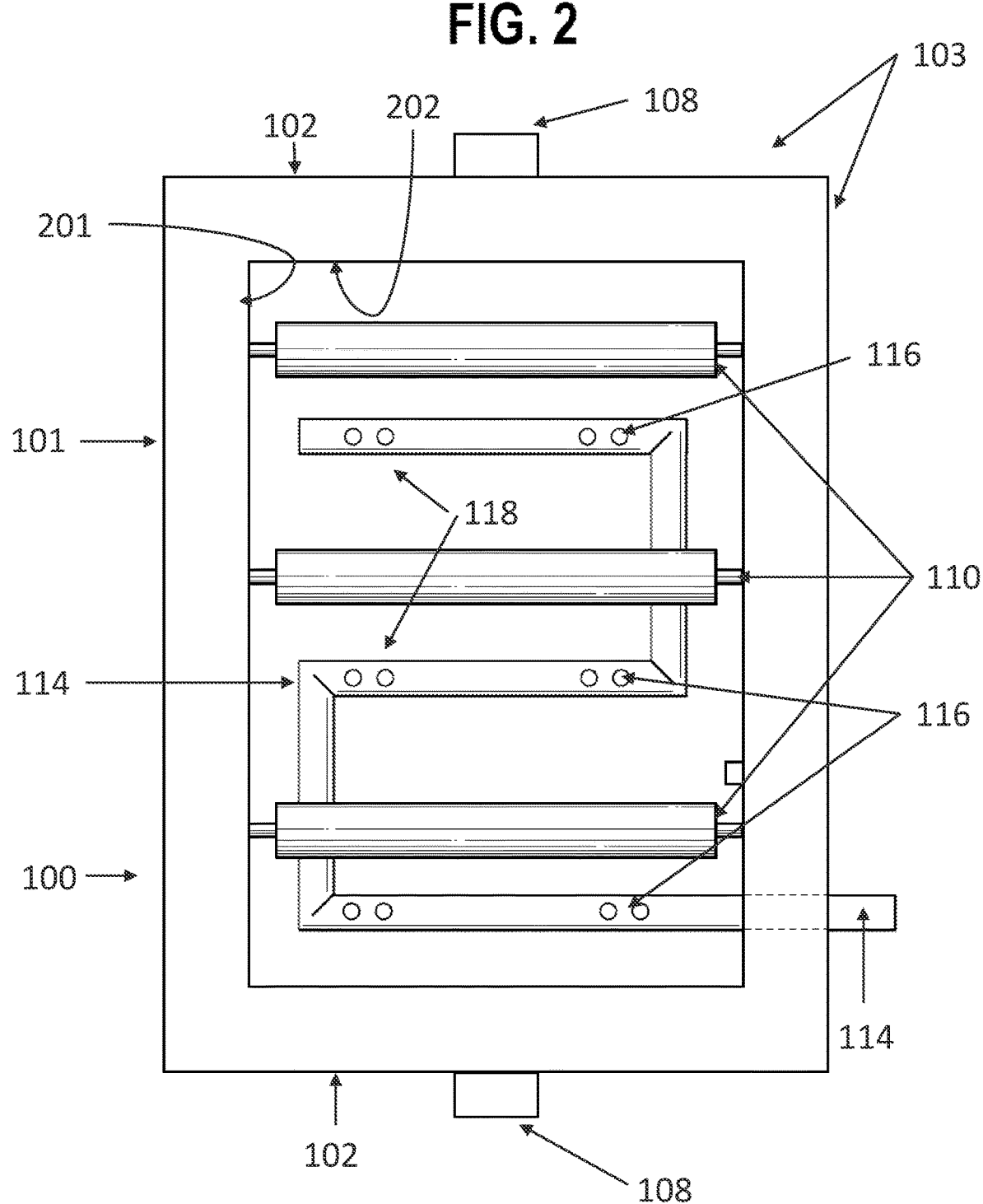
FIG. 2 is a view of an embodiment the hand free footwear and foot cleaning device.
Figure 3:
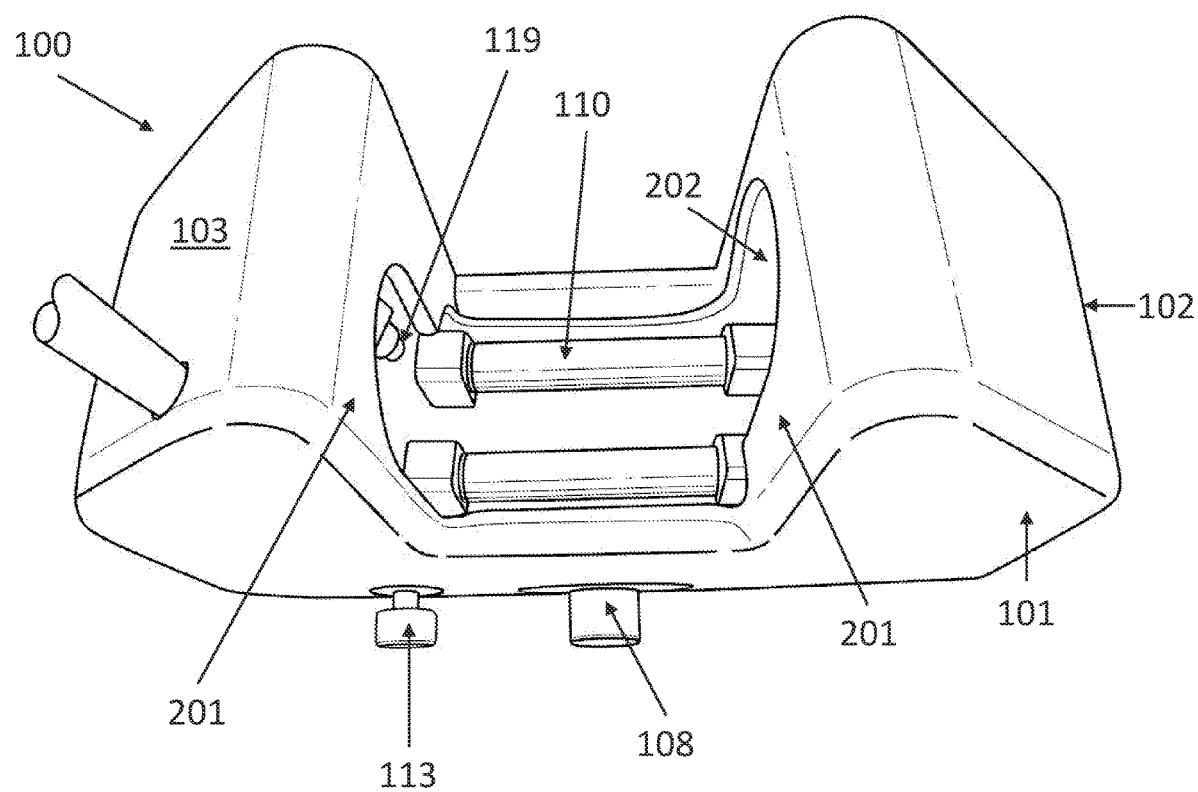
FIG. 3 is a perspective view of an embodiment of the hand free footwear and foot cleaning device.
Figure 4:
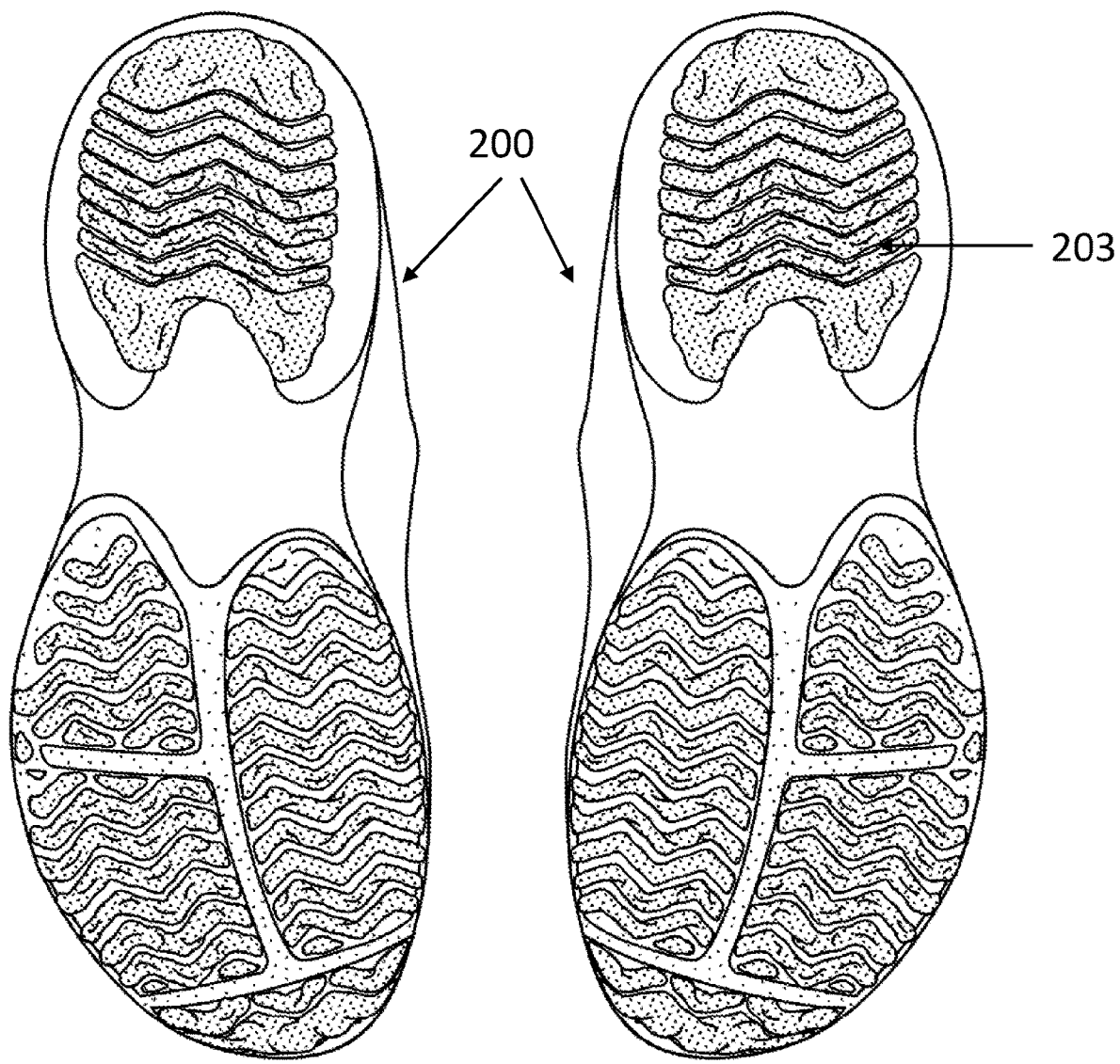
FIG. 4 is a bottom view of the sole of a shoe containing unwanted contaminants and debris.
Figure 5:
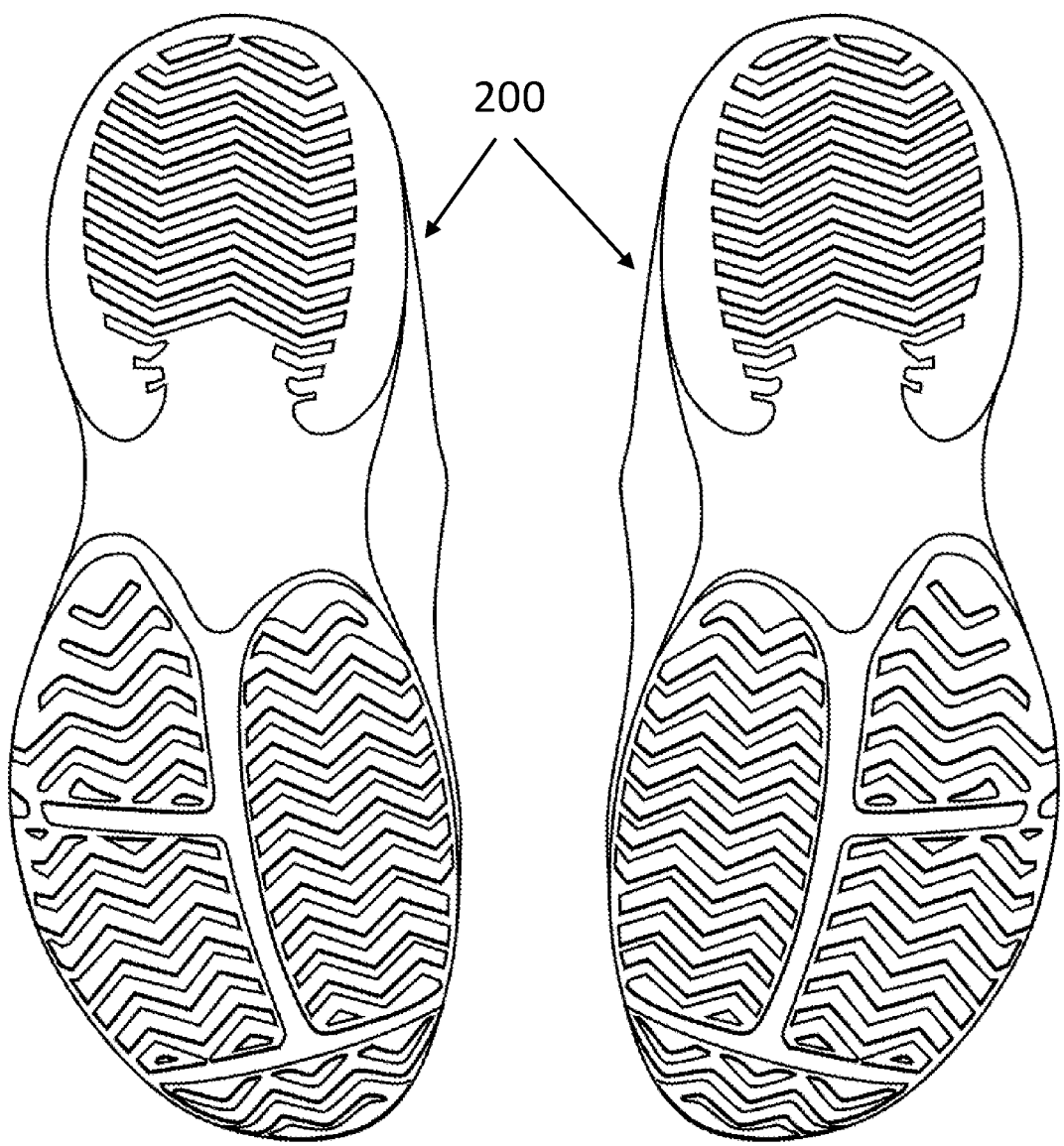
FIG. 5 is a bottom view of the sole of a shoe after the shoe has received treatment from the device of the present invention.

As can be seen from the FIGS. 1-3, the present invention embodies a rectangular base 100, with a heightened wall 101 extending vertically from each lengthier side of the base 100, and a smaller wall 102 on each adjacent side of the base 100. The base 100 may be rectangular or any shape desirable, so long as it is able to accommodate the foot of a user. The walls 101 and the base 100 comprise the main housing 103. The main housing 103 is shown as rectangular in FIGS. 1 and 2. It should be understood that the housing 103 may be manufactured in any shape and may also be configured to accommodate decorative elements if it is so desired. The main housing 103 may be made out of plastic, PVC, rubber, metal or any other suitable material that is capable of withstanding the demands of the cleaning device. It should be applicated by those of ordinary skill in the art that the housing 103 may be constructed from one unitary piece from an injection molding process, or the housing 103 could be constructed of numerous components. The heightened wall 101 and the smaller wall 102 may be configured to accommodate a decorative side panel.

The base 100 may also encompass a sunken basin 105 for the purpose of collecting either liquid or other debris that falls in result of the cleaning process or the sunken basin 105 could collect both. The heightened wall 102 and smaller wall 101 have an interior surface 201 and 202. The surface of the sunken basin 105 may be angled in a direction that will enable water to flow towards the cleanout opening 108. It is possible to place a filter in the sunken basin 105 to separate particulates from the water. The base 100 may also include a cleanout opening 108 facing horizontally and outwardly from the exterior of one of the smaller walls 102, and a cleanout opening 108 facing outwardly and horizontally from the exterior of the opposite smaller wall 102 of the base 100. The base 100 may be elevated from the ground by supports 109 attached at each corner of the bottom of the base 100. The supports 109 may be of plastic, rubber or the same material.

A plurality of rollers 110 can be seen in FIGS. 1, 2 and 3. A plurality of rollers 110 may be attached to the inside of each heightened wall 101 in a plurality of horizontally parallel intervals. The rollers 110 may be positioned horizontally approximately along the center of the main housing 103. It should be appreciated that the number of rollers 110 is not limited to the three rollers as shown in FIG. 2 or two rollers as shown in FIG. 3. The number of rollers 110 is not an important feature of the present invention. Each of the rollers 110 may be connected from the interior of one of the heightened walls 101 to the interior of the opposite heightened walls 101. The rollers 110 may be designed to spin when frictionally engaged with the footwear 200 or foot. It should be appreciated that reference made to footwear 200 should also include the foot of a user if the user is not wearing footwear. The rollers 110 may alternatively be ball bearings. The rollers 110 may be configured to activate a sensor 111 which is present within one of the heightened walls 101 of the housing 103 detects the presence of a foot or footwear 200 within the housing 103 of the device. The rollers 110 may be configured to employ a contact sensor (not shown). There may also be a pressure contact sensor (not shown) on the rollers 110 which operate to activate the valve 128, described in more detail below, when pressure is placed on the roller 110 by the footwear 200. A person of ordinary skill in the art would understand the type of contact sensor which could be employed as part of the rollers 110.

An opening 112 may be present on the exterior of one heightened wall 101, at a position vertically below the rollers 110. The opening 112 may be adapted to attach to a quick connector 113 on the exterior heightened wall 101. An interior water line 114 can be seen in FIGS. 1-2. The interior water line 114 may run through the opening 112 in the heightened wall 101 and may be adapted to attach to and work in connection with the quick connector 113. The water line 114 may have several extensions 115. The first water line 114 may run from the opening in the interior heightened wall 101. The first water line 114 may lay horizontally underneath where the rollers 110 are present, and above the sunken clean-out housing. The first water line 114 may travel horizontally above the center of the sunken basin 105 of the device, and snake in a right-angled fashion (shown in FIG. 2), to reach areas where the water line containing sprayer nozzles 116 interacts with the bottom of the exterior surface of the footwear 200 or the exposed foot if no footwear is worn by the individual. The first water line 114 may be configured to be positioned between the rollers 110 so as to not be blocked by the above rollers 110.

The device may encompass a second water line extension 117, as can be seen in FIG. 1. There is a water line 115 which may extend horizontally at a height above one end of a smaller wall 102 but below the rollers 110. The second water line extension 117 may also extend at a right angle 118 upwards after reaching the opposite heightened wall 101 from which it started. The second water line 117 may extend to nearly the top of the heightened wall 101. The second water line 117 extending at a right angle 118 may extend slightly inward towards the center of the device housing 103 where an attached sprayer 119 may be angled downwards towards the side surface of where the footwear or foot 200 will be placed in the device during operation. It should be understood that nozzles 119 should only implemented in a device that operates on the bare foot of a user rather than on footwear because it is undesirable to spray the top of a shoe while it may be desirable to spray the top of a bare foot. All the nozzles 116, The second water line 117 may operate to remove debris from the bottom of the sole of the footwear 200 or foot. The second water extension 117 may be positioned between the rollers 110 so that the rollers 110 do not interfere with the sprayer 119 toward the sole of the footwear 200. The device may be designed for the user to allow or restrict water from flowing from the upper sprayer 119.

The device may encompass a third water line extension 121, as can be seen in FIGS. 1-2. The third water line extension 121 may extend vertically across the same heightened wall 101 in which the water line 114 entered and may extend to nearly the top of that wall where it reaches a right angle and extends slightly inward towards the center of the device housing where an attached sprayer 119 may be angled downwards towards the side surface of where the footwear or foot will be placed 120 in the devise during operation. The third water line extension 121 may be positioned between a set of rollers 110 such that the roller 110 does not interfere with the sprayer 116 angled toward the bottom of the footwear 200 or foot. The device may be designed for the user to adjust the flow from sprayer 119 to either allow or restrict water from flowing from the upper sprayer 119.

The present invention may encompass a plurality of rollers 110 that support the sole of the footwear 200 or the base of the foot. Each of the first 114, second 117 and third 121 water line extensions may include at least a first spray nozzle 116, a second spray nozzle 118, and a third spray nozzle 119 but can include numerous spray nozzles if desired. The sprayer(s) 119 of the first, second and third water line extensions may be positioned in a fashion that the roller 110 does not interfere with the water jet propelled through the sprayers 119, 116 and 118. While the drawings show three water lines each having one or more sprayers 119, 116 and 118 at each end, the water lines can be placed in numerous different configurations which operate to clean the footwear 200. Likewise, the number of sprayers 119, 116 and 118 attached to each line is not essential to the invention. The invention could also include a set of sprayers 107 that operate to clean the sunken basin 105.

The present invention may also encompass a fourth sprayer 125 configured to spray water in a position along the side sole of the footwear 200 or foot. While FIG. 1 depicts the fourth sprayer 125 on only one side of the footwear 200, it should be understood that there may be a fourth sprayer positioned on the opposite side of the footwear 200 from the fourth sprayer 125 similar to the manner the sprayers 119 are depicted in FIG. 1. It is important that the spray from the fourth sprayer 125 spray the sole of the footwear 200 and not actually spray the upper part of the footwear 200 with water. It is not desirable spray the upper part of the footwear in a manner that would soak the upper portion of the footwear 200. Although not required, the fourth sprayer 125 nozzle is typically positioned to spray in an angled-downward direction so as to prevent the water from contacting the top surface of the footwear 200.

The device may encompass an option to provide a feature that cleans the top surface of a foot placed in the device. This option may be used at beaches, swimming pools or other areas that it is desirable to clean the top surface of the foot as well as the bottom and sides of the foot.

A fifth water line (not shown) may be added to the apparatus described above. A fifth water line extension may operate to clean the top surface of the foot when placed in the device of the current invention. There may be additional sprayers 119 placed above the rollers 110, and aimed towards the top of the foot and exist in a plurality of intervals horizontally across the interior walls of the heightened walls 101, and work in congruence with water lines present along each heightened wall 110, and a plurality of sprayers 119 angled towards the sunken housing 105 to assist in loosening/cleaning debris from the housing 103.

A waterproof housing 126 may contain a battery 127 which operates the valves of the device. The waterproof housing 126 may be fixed to the side of one of the heightened walls 101. While a battery 127 is the preferred power source, numerous different power sources may be use without departing from the spirit of the invention. There may be a low battery light 122 fixed to the top of same heightened wall 101 where the battery housing 126 is present, for the purpose of notifying the user that the battery 127 is running low, and the lower battery light may operate in congruence with the battery. The sensor 111 may be powered by ac power.

The footwear cleaning device of the present invention may include a valve 128 which opens to allow the flow of water into the water line extensions 112, 117, 118 and 121. The valve 128 may be a standard T-valve that is operated manually. Alternatively, the device may include a photocell (as part of sensor 111) fixed internally to the same heightened wall 101 where the battery housing 126 is fixed and works in connection with the battery 127. The device could also be powered by AC power if desired. The photocell 111 may sense the presence of the footwear 200 or foot within the main housing 103 of the device. The photocell 111 may send a signal to a solenoid which opens the valve when the footwear 200 or foot is detected. The photocell may signal the device to operate when the footwear 200 or foot enters the main housing 103, and to cease operating when the footwear 200 or foot is removed from the main housing 103. The device could alternatively be programmed to automatically cease operating after a desired period of time, such as thirty seconds. In addition to the photocell described above, the valve could alternatively be controlled by pressure sensors built into the rollers 110. In such a configuration, the rollers 110 may include a pressure sensor (not shown) such that when pressure is applied to one of the rollers 110, the sensor operates to open the valve 128.

The above description is not intended to limit the meaning of the words used in or the scope of the following claims that define the invention. Rather the descriptions and illustrations have been provided to aid in understanding the various embodiments. It is contemplated that future modifications in structure, function or result will exist that are not substantial changes and that all such insubstantial changes in what is claimed are intended to be covered by the claims. Thus, while preferred embodiments of the present inventions have been illustrated and described, one of skill in the art will understand that numerous changes and modifications can be made without departing from the claimed invention. In addition, although the term "claimed invention" or "present invention" is sometimes used herein in the singular, it will be understood that there is a plurality of inventions as described and claimed. Although embodiments of the present invention have been described, those of skilled in the art will appreciate that variations and modifications may be made without departing from the spirit and scope thereof as defined by the appended claims.

What is claimed:

1. A footwear or foot cleaning device comprising:
   a base;
   a first side wall section, a second side wall section, a first end wall section and a second end wall section supported by the base to form a housing wherein the base and wall sections are configured to form a footwear receiving area wherein the height of the first side wall and second side wall is configured to extend to a height above a footwear or foot when the footwear or foot is placed in the device to encompass the footwear or foot within the footwear receiving area;
   an angled, sunken basin defined by the base, wherein the angled, sunken basin defines a space sunk below the edges of the first side wall section and second side wall section and is configured to collect water and debris;
   a plurality of rollers affixed to the base, and configured to freely spin when the footwear is positioned in the footwear receiving area wherein the plurality of rollers define a contact axis formed between the first side wall section and the second side wall section;
   a water inlet positioned in the base including a valve;
   a first water line extension positioned in the base, the first water line extension includes a first water spray nozzle to spray a stream of water, the first water spray nozzle is positioned below the contact axis, wherein the first water line sprayer nozzle is adapted to spray in a direction such that the spray contacts the bottom portion of a sole of a footwear or foot that when positioned in the footwear receiving area;
   a second water line extension positioned in the first sidewall and the second sidewall, the second water line extension includes a second water spray nozzle to spray a stream of water, the second water spray nozzle is positioned along the contact axis, wherein the second water spray nozzle is adapted to spray in a direction such that the spray contacts the side portion of the sole of a footwear or foot that when positioned in the footwear receiving area;
   a third water line extension extending from the first sidewall and the second sidewall, the third water line extension includes a third water spray nozzle to spray a stream of water, the third water spray nozzle is positioned above the contact axis, wherein the third water spray nozzle extends out from the first sidewall and second sidewall and downwards toward the angled, sunken basin to spray in a direction such that the spray contacts the top portion of the top of a footwear or foot that when positioned in the footwear receiving area, and
   a sensor affixed to the housing to detect the presence of the footwear or the foot in the footwear receiving area of the housing, wherein the sensor activates a solenoid connected to the valve to operate to open the valve and allow water to the first water spray nozzle and the second water spray nozzle until the footwear or the foot is removed from the footwear receiving area.

2. The footwear or foot cleaning device of claim 1, wherein the sensor is a photocell.

3. The footwear or foot cleaning device of claim 2, further comprising a fourth water line extension positioned in the base, the fourth water line extension includes a fourth water spray nozzle that is adapted to spray in a direction to contact a debris that is collected in the angled, sunken basin; wherein the fourth ater spray nozzle is activated upon activation of the sensor.

4. The footwear or foot cleaning device of claim 3, further comprising a filter positioned within the angled, sunken basin.

5. The footwear or foot cleaning device of claim 4, further comprising a drain in the angled, sunken basin configured to extract water from the basin.

6. The footwear or foot cleaning device of claim 1, wherein the sensor opens a valve for a predetermined period of time after the sensor detects the presence of the footwear or the foot in the footwear receiving area to activate the first water spray nozzle and the second water spray nozzle.

7. The footwear or foot cleaning device of claim 1, wherein the first water spray nozzle and second water spray nozzle are positioned to maintain the water directed from the first water spray nozzle and the second water spray nozzle within the footwear receiving area.

8. The footwear or foot cleaning device of claim 1, further comprising a fourth water line extension positioned in the base, the fourth water line extension includes a fourth water spray nozzle that is adapted to spray in a direction to contact a debris that is collected in the angled, sunken basin; wherein the fourth water spray nozzle is activated upon activation of the sensor.

9. The footwear or foot cleaning device of claim 8, wherein the fourth water spray nozzle is configured to maintain the water directed from the fourth water spray nozzle within the footwear receiving area.

10. The footwear or foot cleaning device of claim 1, wherein the solenoid connected to the valve to open and close the valve and is powered by AC power.

11. The footwear or foot cleaning device of claim 1, wherein the solenoid connected to the valve is powered by DC power.

12. The footwear or foot cleaning device of claim 1, further comprising a filter positioned within the angled, sunken basin.

13. The footwear or foot cleaning device of claim 12, further comprising a drain in the angled, sunken basin configured to extract water from the angled, sunken basin.

14. The footwear or foot cleaning device of claim 1, wherein the sensor is a pressure sensor that operates to activate the valve to open the valve until pressure from the footwear or foot is removed from one of the plurality of rollers.

15. The footwear or foot cleaning device of claim 14, wherein the pressure sensor is operated for a predetermined period of time after the pressure sensor detects the presence of the footwear or the foot in the footwear receiving area.

* * * * *